(12) United States Patent
Margalit et al.

(10) Patent No.: US 9,553,882 B2
(45) Date of Patent: Jan. 24, 2017

(54) CORRELATION OF ADVERTISING CONTENT TO MALICIOUS SOFTWARE

(71) Applicant: EMPIRE TECHNOLOGY DEVELOPMENT LLC, Wilmington, DE (US)

(72) Inventors: Mordehai Margalit, Zikhron Ya'akov (IL); Vlad Grigore Dabija, Mountain View, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/480,041

(22) Filed: Sep. 8, 2014

(65) Prior Publication Data

US 2016/0072828 A1 Mar. 10, 2016

(51) Int. Cl.
*H04L 29/06* (2006.01)
*H04L 29/08* (2006.01)

(52) U.S. Cl.
CPC ....... *H04L 63/1416* (2013.01); *H04L 63/1458* (2013.01); *H04L 63/1441* (2013.01); *H04L 67/02* (2013.01)

(58) Field of Classification Search
CPC ............................ H04L 63/1441; G06F 21/554
USPC ...................................... 235/379; 726/22, 23
See application file for complete search history.

(56) References Cited

U.S. PATENT DOCUMENTS

| | | | |
|---|---|---|---|
| 2008/0295169 A1* | 11/2008 | Crume | H04L 63/1441 726/22 |
| 2011/0126190 A1* | 5/2011 | Urbach | G06F 9/44521 717/178 |
| 2011/0145920 A1 | 6/2011 | Mahaffey et al. | |
| 2012/0151033 A1 | 6/2012 | Baliga et al. | |
| 2013/0291107 A1 | 10/2013 | Marck et al. | |
| 2015/0117215 A1* | 4/2015 | Nagaraja | H04L 12/1895 370/236 |
| 2015/0172313 A1* | 6/2015 | Beryozkin | H04L 63/1425 726/22 |
| 2015/0207812 A1* | 7/2015 | Back | H04L 63/1408 726/23 |
| 2015/0304347 A1* | 10/2015 | Smith | G06F 21/554 726/22 |

OTHER PUBLICATIONS

"Botnet Detection," accessed at https://web.archive.org/web/20140331203520/https://www.shadowserver.org/wiki/pmwiki.php/Information/BotnetDetection, accessed on Aug. 21, 2014, pp. 1-2.

(Continued)

*Primary Examiner* — Allyson Trail
(74) *Attorney, Agent, or Firm* — Moritt Hock & Hamroff LLP; Steven S. Rubin, Esq.

(57) ABSTRACT

Technologies are generally described for systems, methods and devices effective to analyze a file. In some examples, a processor may receive the file. The file may include content and instructions. The content may include data executable by a browser. The processor may analyze the instructions. The processor may identify an internet protocol (IP) address in the instructions based on the analysis. The processor may compare the identified IP address with a list of IP addresses associated with an attack. The processor may generate an alert based on the comparison.

17 Claims, 5 Drawing Sheets

(56) References Cited

OTHER PUBLICATIONS

"Bots &; Botnet: An Overview," accessed at https://web.archive.org/web/20131207131804/http://www.sans.org/reading-room/whitepapers/malicious/bots-botnet-overview-1299, Aug. 8, 2003, pp. 1-18, SANS Institute.

"Configuring the Botnet Traffic Filter," accessed at https://web.archive.org/web/20131205202947/http://www.cisco.com/en/US/docs/security/asdm/6_2/user/guide/conns_botnet.html, accessed on Aug. 20, 2014, pp. 1-9.

"Honeypot," Wikipedia, accessed at https://web.archive.org/web/20131227122057/http://en.wikipedia.org/wiki/Honeypot, Last modified Sep. 3, 2013, pp. 1-3.

"Online advertising," Wikipedia, accessed at https://web.archive.org/web/20140813135855/http://en.wikipedia.org/wiki/Online_advertising, Last modified on Aug. 8, 2014, pp. 1-15.

Dornseif, M., et al., "Vulnerability Assessment using Honepots," KG Saur Verlag, Munich, 2004, pp. 195-202.

Freiling, C. F., et al., "Botnet Tracking: Exploring a Root-Cause Methodology to Prevent Distributed Denial-of-Service Attacks," Proceedings of the 10th European conference on Research in Computer Security, 2005, pp. 319-335.

Hsu, C.-H., et al., "Fast-Flux Bot Detection in Real Time," Proceedings of the 13th international conference on Recent advances in intrusion detection, 2010, pp. 464-483.

Rubenking, N. J., "Black Hat Briefing: Building a Million Browser Botnet for Cheap," accessed at https://web.archive.org/web/20131119132424/http://securitywatch.pcmag.com/security/314341-black-hat-briefing-building-a-million-browser-botnet-for-cheap, Jul. 31, 2013, pp. 1-2.

\* cited by examiner

CORRELATION OF ADVERTISING CONTENT TO MALICIOUS SOFTWARE

BACKGROUND

Unless otherwise indicated herein, the materials described in this section are not prior art to the claims in this application and are not admitted to be prior art by inclusion in this section.

Malicious software, or malware, may be used to obtain access to a computer system, accumulate information from a computer or system, or to disrupt computer systems operations. Malware is often hidden or disguised in non-threatening files. Malware may be used to cause a denial of service or distributed denial of service (DDoS) attack. A denial of service or distributed denial of service (DDoS) attack may be a malicious attempt to make a resource on a network unavailable to users and may be perpetrated by saturating a target with external communication requests to lead to server overload.

SUMMARY

According to some examples, methods to analyze a file are generally described. The methods may include a processor receiving the file. The file may include content and instructions. The content may include data executable by a browser. The methods may include the processor analyzing the instructions. The methods may include the processor identifying an internet protocol (IP) address in the instructions based on the analysis. The methods may include the processor comparing the identified IP address with a list of IP addresses associated with an attack. The methods may include the processor generating an alert based on the comparison.

According to other examples, systems configured to analyze a file are generally described. The systems may include a processor configured to communicate with a memory. The memory may include first instructions. The processor may be configured to receive the file. The file may include content and second instructions. The content may include data executable by a browser. The processor may be configured to analyze the second instructions. The processor may be configured to identify an internet protocol (IP) address in the second instructions based on the analysis. The processor may be configured to compare the identified IP address with a list of IP addresses associated with an attack. The processor may be configured to generate an alert based on the comparison.

According to further examples, methods to analyze a file are generally described. The methods may include a processor receiving the file. The file may include content and instructions. The content may include data executable by a browser to display an advertisement. The methods may include the processor executing the file. The methods may include the processor analyzing an amount of resources used by the instructions on the processor during the execution of the file. The methods may include the processor generating an alert based on the analysis.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
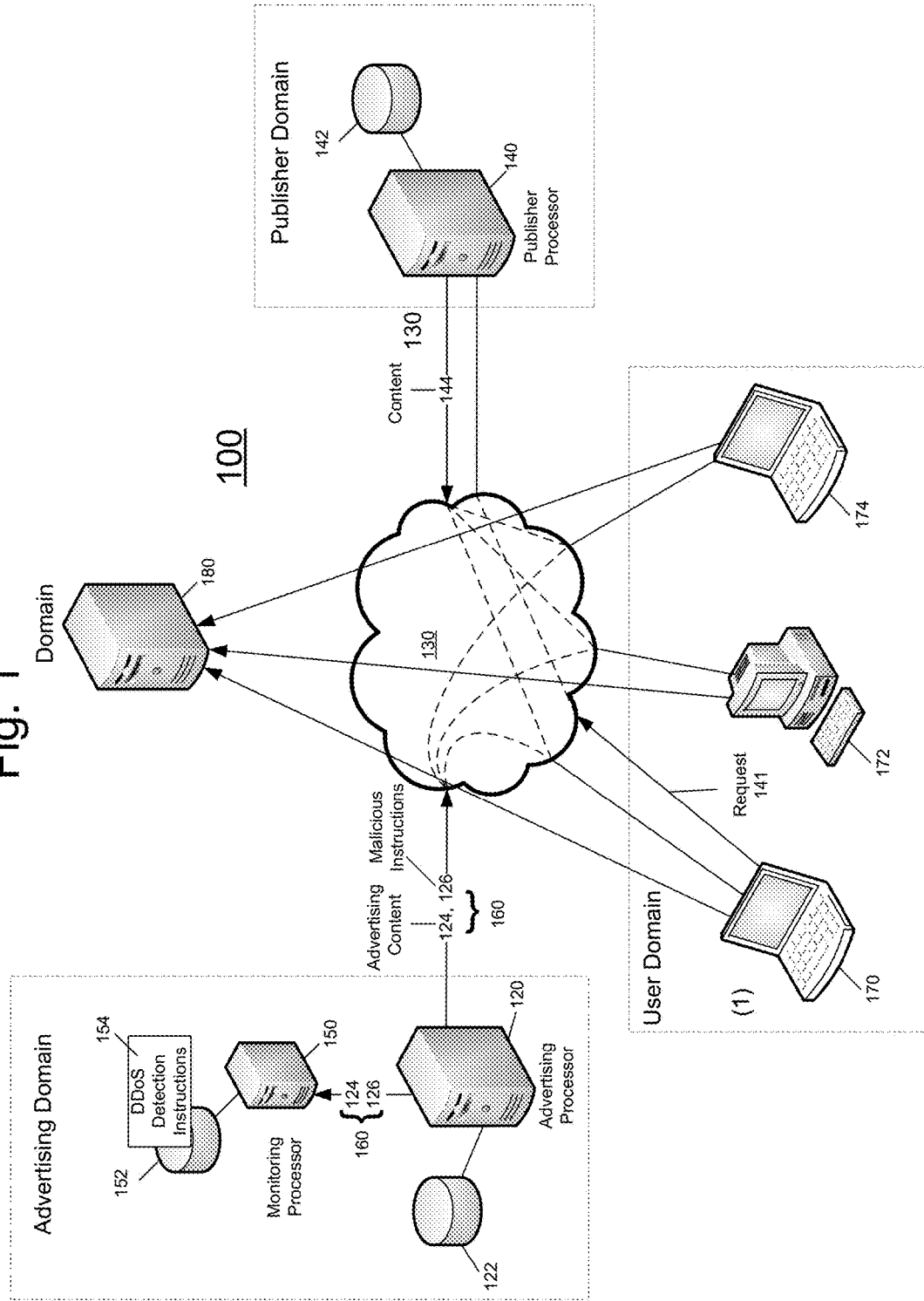
FIG. 1 illustrates an example system that can be utilized to implement correlation of advertising content to malicious software.

all arranged in accordance with at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to correlation of advertising content to malicious software.

Briefly stated, technologies are generally described for systems, methods and devices effective to implement correlation of advertising content to malicious software. In some examples, a processor may receive a file. The file may include content and instructions. The content may include data executable by a browser. For example, the content may be advertising content. The instructions may be malicious software. The processor may analyze the instructions. The processor may identify an internet protocol (IP) address in the instructions based on the analysis. For example, the processor may identify an IP address within the instructions which may be contacted by the processor upon execution of the instructions. The processor may compare the identified IP address with a list of IP addresses associated with an attack. The processor may generate an alert based on the comparison indicating that the IP address is associated with malicious software.

FIG. 1 illustrates an example system 100 that can be utilized to implement correlation of advertising content to malicious software, arranged in accordance with at least some embodiments presented herein. System 100 may include an advertising processor 120, a publisher processor 140, a monitoring processor 150, user devices 170, 172, 174, and an IP address processor 180. Advertising processor 120, publisher processor 140, monitoring processor 150, user devices 170, 172, 174, and IP address processor 180 may be configured to be in communication over a network 130. Network 130 may be the Internet or any other network. Advertising processor 120 may be configured to be in communication with a memory 122. Publisher processor 140 may be configured to be in communication with a memory 142. Monitoring processor 150 may be configured to be in communication with a memory 152. Memory 152 may include distributed denial of services (DDoS) detection instructions 154. User devices 170, 172, 714 may be computing devices, such as a desktop computer, laptop computer, tablet, smartphone, wearable device, or any other computing device.

As explained in more detail below, data associated in a file may include malicious content and may include instructions effective to hijack computers to perform an attack. Examples of an attack may include a distributed denial of service (DDoS) attack on a processor or domain, overuse of computer resources, overuse or damage to storage resources, bitcoin mining, or other cooperative actions such as breaking a cryptographic code. In some examples, such a file may be an advertisement file containing one or more advertisements, or another file associated with a DDoS attack. Malicious content included in an advertisement file may be data or code which may use computer resources beyond displaying the advertising content. For example, in a User Domain, at (1) a user device 170 may generate a request 141 for content 144 from publisher processor 140. At (2), publisher processor 140 may send content 144 to user device 170. Content 144 may include content from memory 142 and instructions to obtain advertising file 160 from advertising processor 120. Advertising processor 120 may be part of an advertising network in an Advertising Domain. User device 170 may request and receive advertising file 160 from advertising processor 120 over network 130. Advertising file 160 may include advertising content 124 and malicious instructions 126. Advertising content 124 may include advertising content from memory 122. Advertising content 124 may also include instructions for accessing advertising content from other servers.

Malicious instructions 126 may be hidden in advertising file 160 and may include spyware, malware, a bot net, DOS instructions, or any other form of malicious software and/or cyber threats. Malicious instructions 126 may be, for example, in JavaScript, and when executed may perform similar functions as advertising content 124 such as accessing content from other servers. Malicious instructions 126 may include instructions to perform Internet requests to a specific server or domain. A processor in device 170 may execute instructions in malicious instructions 126 while executing advertising file 160. In an example, malicious instructions 126 may include instructions to perform requests to a Domain 180. Domain 180 may thereby experience a DDoS attack, in response to the amount of Internet requests sent to the specific domain. Such a scenario may occur when malicious instructions 126 in advertising file 160 are distributed to multiple devices.

For example, advertising processor 120 may be associated with an advertising network which may provide advertising file 160 including advertising content 124 and malicious instructions 126 to multiple publisher processors, including publisher processor 140. Publisher processor 140 may provide content 144 to multiple devices (e.g., devices 170, 172, and 174). Content 144 may include instructions to obtain advertising file 160 from advertising processor 120. Advertising file 160 may include advertising content 124 and malicious instructions 126. The multiple devices may execute advertising file 160, including malicious instructions 126, and send requests to Domain 180. As described in more detail below, monitoring processor 150 may, by executing DDoS detection instructions 154, identify advertising file 160, including advertising content 124 and malicious instructions 126, as being associated with a DDoS attack.

Figure 2:
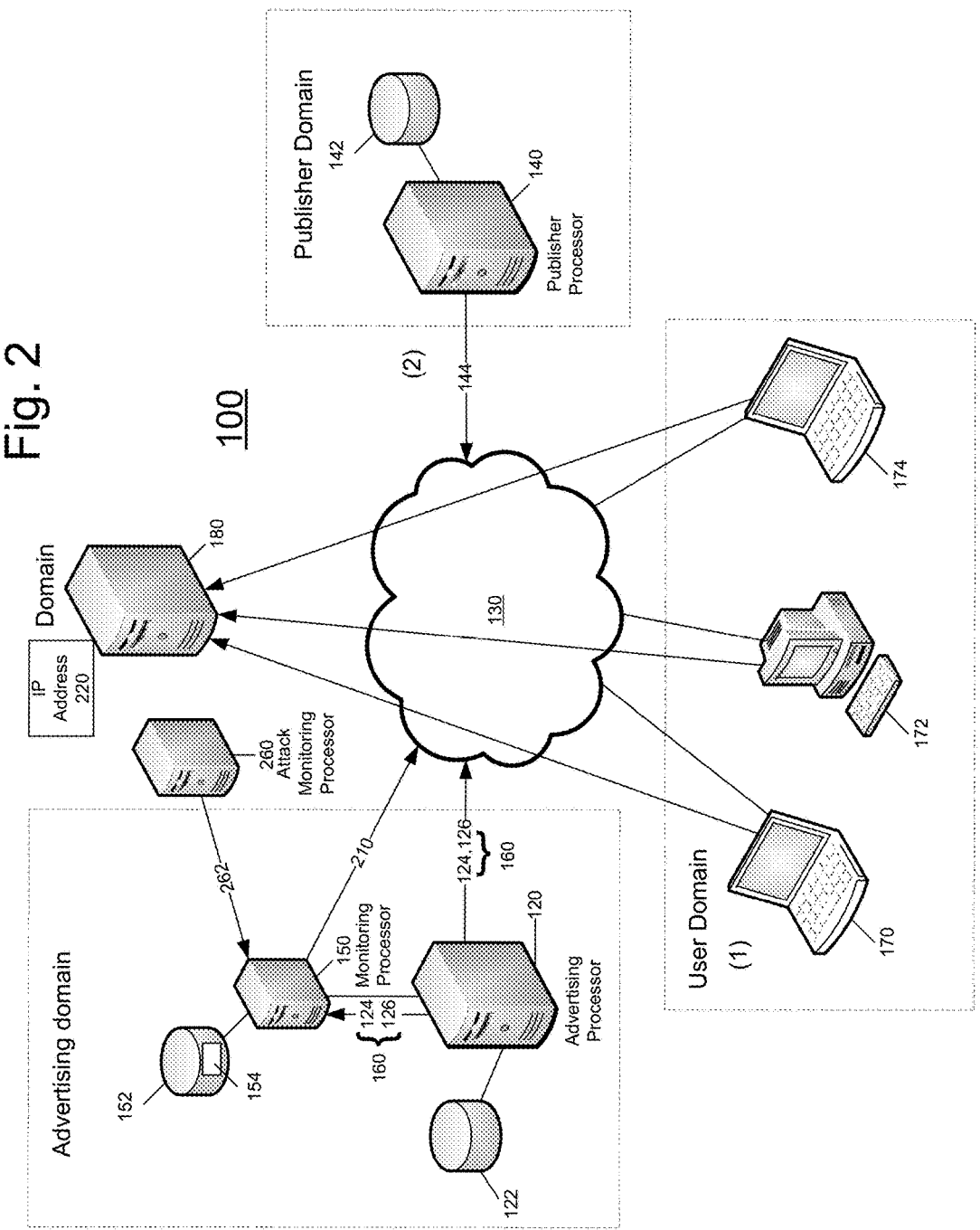
FIG. 2 illustrates the example system of FIG. 1 depicting further details relating to correlation of advertising content to malicious software.

FIG. 2 illustrates example system 100 of FIG. 1 depicting further details relating to correlation of advertising content to malicious software, arranged in accordance with at least some embodiments presented herein. System 100 of FIG. 2 is substantially similar to system 100 of FIG. 1, with additional details. Those components in FIG. 2 that are labeled identically to components of FIG. 1 will not be described again for the purposes of clarity. System 100 may further include an attack monitoring processor 260.

Monitoring processor 150 may be configured to receive advertising file 160. Advertising file 160 may include advertising content 124 and malicious instructions 126 and may be sent by advertising processor 120. Monitoring processor 150, upon receiving advertising file 160 from advertising processor 120, may execute advertising file 160, such as by executing with a browser associated with monitoring processor 150. The browser may execute advertising file 160 including advertising content 124 and malicious instructions 126. Advertising content 124 may include data executable by the browser effective to display an advertisement and malicious instructions may include instructions to access an IP address. Monitoring processor 150 may execute DDoS detection instructions 154 to analyze advertising file 160 including advertising content 124 and malicious instructions 126. Monitoring processor 150 may identify internet protocol (IP) addresses 210 accessed by executed advertising file 160. Monitoring processor 150 may further receive a list 262 of IP addresses that are under a DDoS attack from attack monitoring processor 260. Attack monitoring processor 260 may be associated with a vendor such as SYMANTEC, CISCO, CHECKPOINT, or any other vendor or system that may identify and provide information on active DDoS attacks.

Monitoring processor 150, by executing DDoS detection instructions 154, may compare the identified IP addresses 210 accessed by advertising file 160, including advertising content 124 and malicious instructions 126, with list 262 of IP addresses under DDoS attack. In an example, monitoring processor 150 may determine an IP address 220 in IP addresses 210 that is on list 262 of IP addresses under a DDoS attack. Monitoring processor 150 may identify the corresponding advertising file 160, including advertising content 124 and malicious instructions 126, which may be addressed to IP address 220. Monitoring processor 150 may correlate advertising file 160 with malicious software in response to identifying IP address 220 is under a DDoS attack. Monitoring processor 150 may generate an alert based on the determination that advertising file 160, including advertising content 124 and malicious instructions 126, is addressed to IP address 220 is under a DDoS attack. Monitoring processor 150 may identify advertising file 160 in the alert. Monitoring processor 150 may thereafter, in response to the alert, quarantine advertising file 160 and may remove advertising file 160 from advertising network. Monitoring processor 150 may identify a provider of advertising file 160 as a provider of suspect advertisements and malicious software.

In another example, monitoring processor 150 may send the alert, identifying advertising file 160, to advertising processor 120 in an advertising network in advertising domain. Advertising processor 120 may thereafter quarantine advertising file 160 and may remove advertising file 160 from advertising network. Advertising processor 120 may identify a provider of advertising file 160 as a provider of suspect advertisements and malicious software.

In another example, monitoring processor 150 may be configured to receive advertising file, including advertising content 124 and malicious instructions 126, sent by advertising processor 120. Monitoring processor 150, upon receiving advertising file 160 from advertising processor 120, may execute advertising file 160, including advertising content 124 and malicious instructions 126. Monitoring processor 150 may execute DDoS detection instructions 154 to analyze an amount of resources used by processor 150 during execution of advertising file 160. Monitoring processor 150 may determine the amount of resources used by processor 150 during execution of advertising file 160 exceeds a threshold amount. Monitoring processor 150 may correlate advertising file 160 with malicious software due to the amount of resources used by processor 150 during execution of advertising file 160, exceeding the threshold amount. Monitoring processor 150 may generate an alert based on determining that the amount of resources used by processor 150 during execution of advertising file 160, including advertising content 124 and malicious instructions 126, exceeds the threshold amount.

Among other possible benefits, a system in accordance with the present disclosure may enable advertising domains to identify and mitigate advertisements that include malware or other malicious software. Advertising domains may be able to determine sources of advertisements that include malware and prevent these sources from future advertising access. A system in accordance with the present disclosure may prevent future DDoS attacks by removing the source of a DDoS attack rather than limiting user access to the Internet by preventing IP addresses sending DDoS attacks access.

Figure 3:
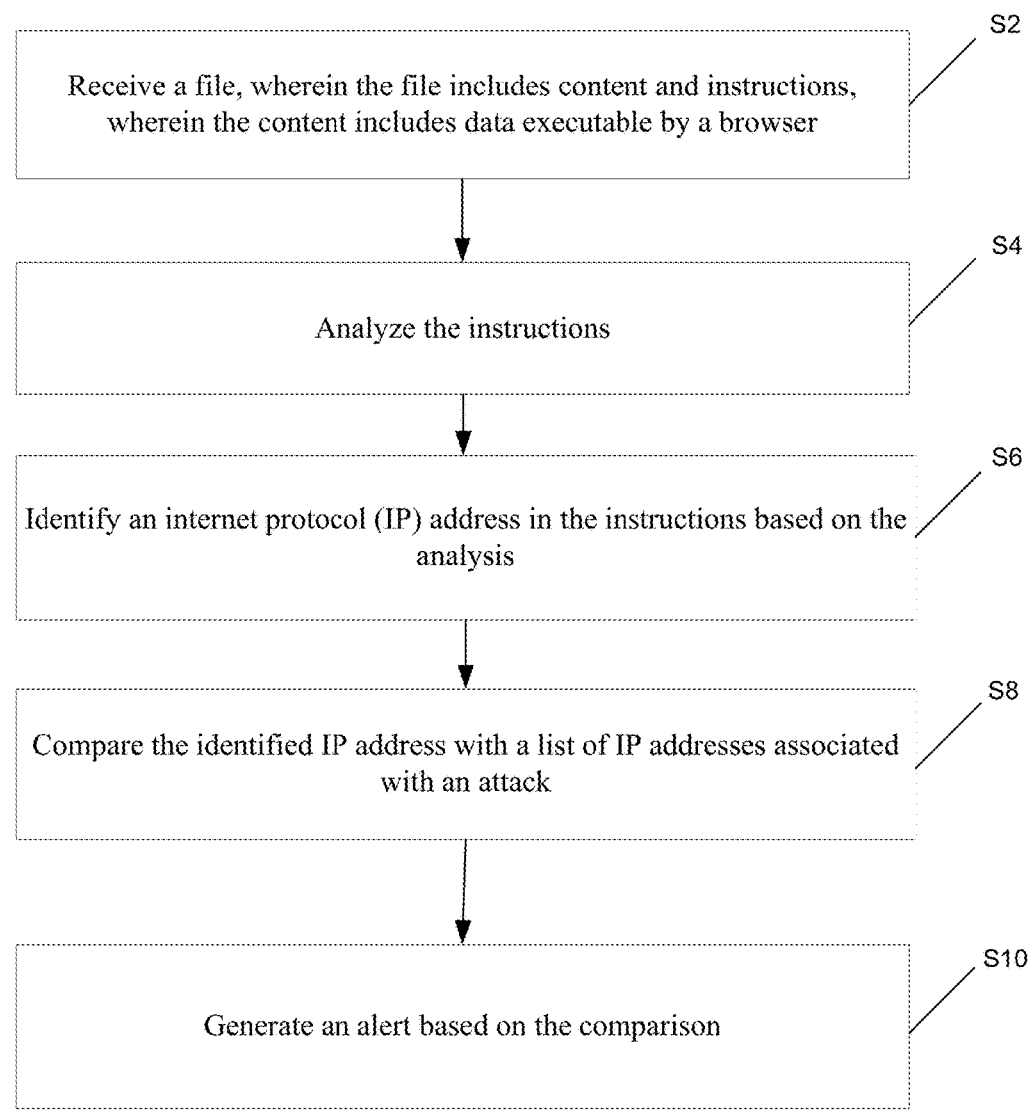
FIG. 3 illustrates a flow diagram for an example process to implement correlation of advertising content to malicious software.

FIG. 3 illustrates a flow diagram for an example process to implement correlation of advertising content to malicious software, arranged in accordance with at least some embodiments presented herein. The process in FIG. 3 could be implemented using, for example, system 100 discussed above. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2 "Receive a file, wherein the file includes content and instructions, wherein the content includes data executable by a browser." At block S2, the processor may receive the file. The file may include content and instructions. The file may be an advertisement. The content may include data executable by a browser. The file may be received from a content provider. The file may be provided by an advertising network.

Processing may continue from block S2 to block S4 "Analyze the instructions." At block S4, the processor may analyze the instructions in the file. The processor may execute the instructions such as by executing with a browser.

Processing may continue from block S4 to block S6 "Identify an internet protocol (IP) address in the instructions based on the analysis." At block S6, the processor may identify an internet protocol (IP) address in the instructions based on the analysis. The processor may execute the instructions with a browser and identify an IP address accessed by the instruction when the instructions are executed by the browser.

Processing may continue from block S6 to block S8 "Compare the identified IP address with a list of IP addresses associated with an attack." At block S8, the processor may compare the identified IP address with a list of IP addresses associated with an attack. The processor may receive the list of IP addresses under DDoS attack from an attack monitoring processor. The attack monitoring processor may be associated with a vendor such as SYMANTEC, CISCO, CHECKPOINT, or any other vendor or system may identify and provide information on active DDoS attacks.

Processing may continue from block S8 to block S10 "Generate an alert based on the comparison." At block S10, the processor may generate an alert based on the comparison. The processor may determine the identified IP address is on the list of IP addresses under attack. The processor may determine the file includes malicious content which is addressed to an IP address under a DDoS attack. The processor may generate an alert based on the comparison determining the file includes malicious content.

Figure 4:
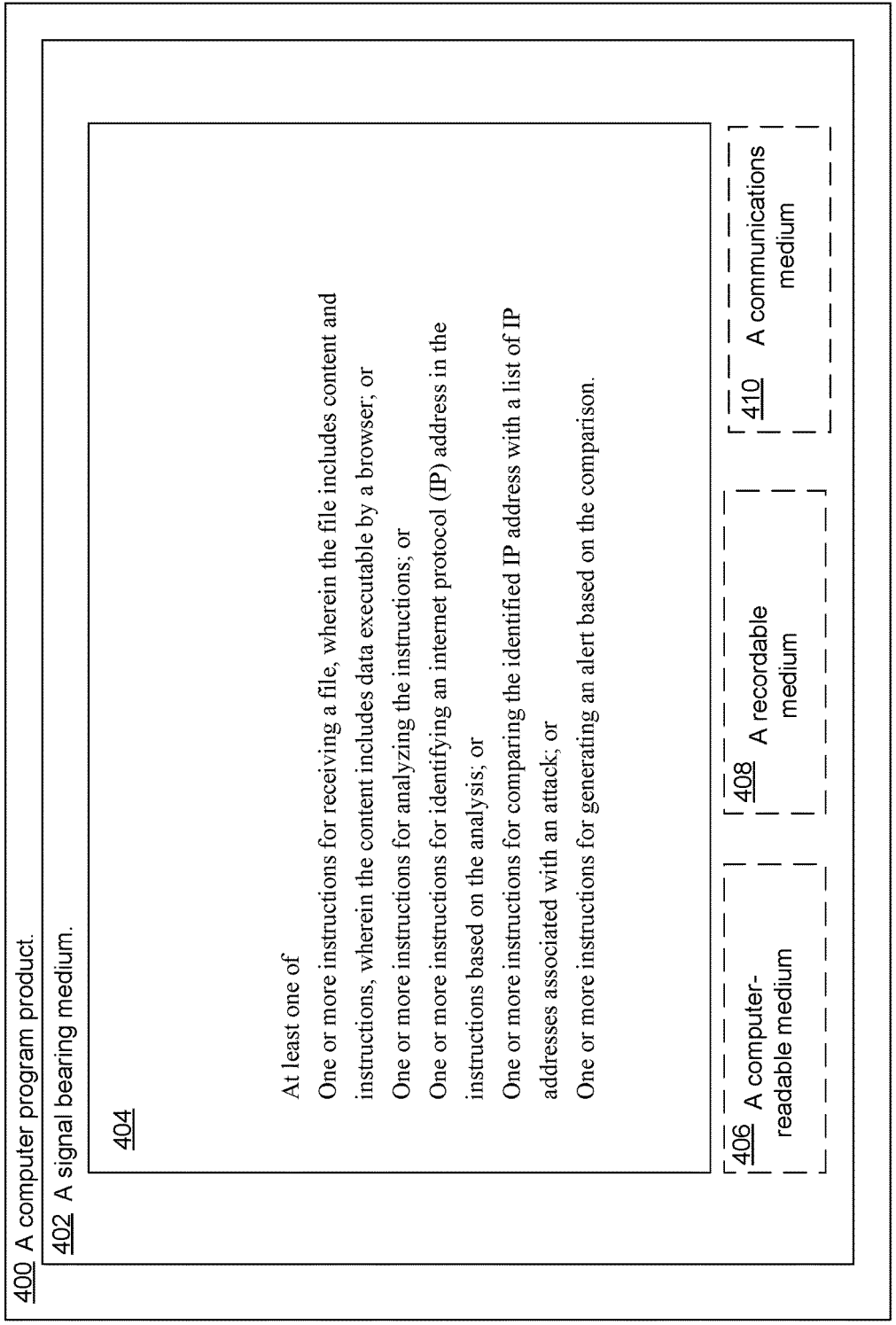
FIG. 4 illustrates computer program products effective to implement correlation of advertising content to malicious software.

FIG. 4 illustrates a computer program product 400 effective to implement correlation of advertising content to malicious software arranged in accordance with at least some embodiments presented herein. Computer program product 400 may include a signal bearing medium 402. Signal bearing medium 402 may include one or more instructions 404 that, when executed by, for example, a processor, may provide the functionality described above with respect to FIGS. 1-3. Thus, for example, referring to system 100, monitoring processor 150 may undertake one or more of the blocks shown in FIG. 4 in response to instructions 404 conveyed to the system 100 by signal bearing medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
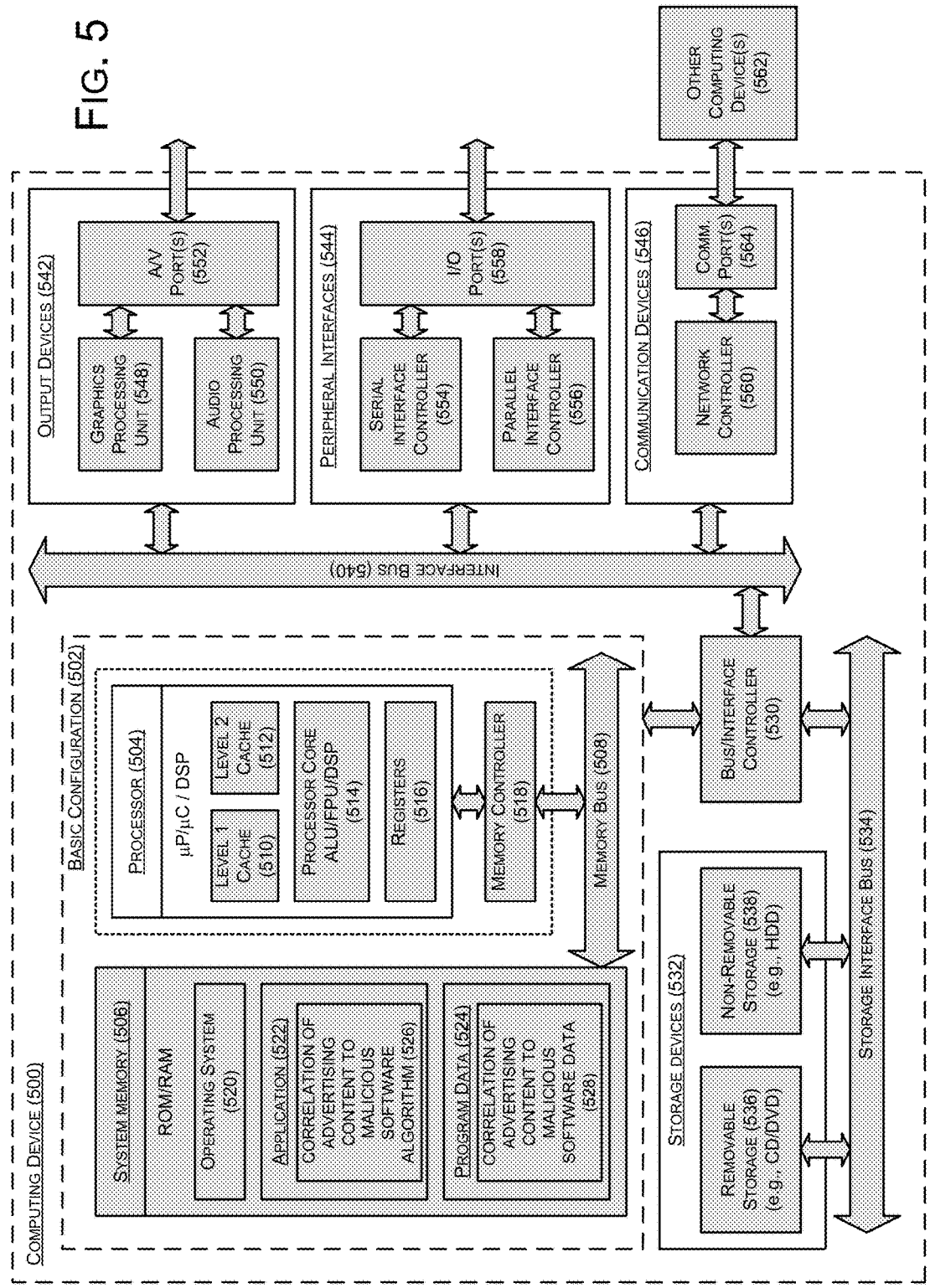
FIG. 5 is a block diagram illustrating an example computing device that is arranged to implement correlation of advertising content to malicious software.

FIG. 5 is a block diagram illustrating an example computing device 500 that is arranged to implement correlation of advertising content to malicious software, arranged in accordance with at least some embodiments presented herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may include a correlation of advertising content to malicious software algorithm 526 that is arranged to perform the functions as described herein including those described previously with respect to FIGS. 1-4. Program data 524 may include correlation of advertising content to malicious software data 528 that may be useful for correlation of advertising content to malicious software as is described herein. In some embodiments, application 522 may be arranged to operate with program data 524 on operating system 520 such that correlating advertising content to malicious software may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to analyze a file, the method comprising, by a processor: receiving the file from a first internet protocol (IP) address, wherein the file includes content and instructions, wherein the file further includes an advertisement from an advertising network and the content includes data executable by a browser; analyzing the instructions; identifying a second internet protocol (IP) address in the instructions based on the analysis, where the second IP address is different from the first IP address; comparing the second IP address with a list of IP addresses experiencing an attack; generating an alert based on the comparison, sending the generated alert to the advertising network.

2. The method of claim 1, wherein the attack includes a distributed denial of service (DDoS) attack.

3. The method of claim 1, wherein the content includes an advertisement.

4. The method of claim 1, wherein the analyzing is performed by execution of the file with the browser to determine the second IP address requested by the executed file.

5. The method of claim 1, wherein the processor is associated with the advertising network and the alert includes an identification of the advertisement, the method further comprises:
    quarantining, by the processor, the identified advertisement.

6. The method of claim 5, further comprising identifying, by the advertising network, a provider of the advertisement.

7. The method of claim 1, wherein the attack includes a distributed denial of service (DDoS) attack and the alert includes an identification of the advertisement, the method further comprises:
    quarantining, by the advertising network, the identified advertisement; and
    identifying, by the advertising network, a provider of the advertisement.

8. The method of claim 1, wherein:
    the attack includes a distributed denial of service (DDoS) attack and the alert includes an identification of the advertisement;
    the analyzing is performed by execution of the file with the browser to determine the second IP address requested by the executed file; and the method further comprises:
    quarantining, by the advertising network, the identified advertisement; and
    identifying, by the advertising network, a provider of the advertisement.

9. A system configured to analyze a file, the system comprising: a processor configured to communicate with a memory, the memory including first instructions, wherein the processor is configured to: receive the file from a first internet protocol (IP) address, wherein the file includes content and second instructions, wherein the file further includes an advertisement from an advertising network, wherein the content includes data executable by a browser; analyze the second instructions; identify a second internet protocol (IP) address in the second instructions based on the analysis, where the second IP address is different from the first IP address, compare the second IP address with a list of IP addresses experiencing an attack; generate an alert based on the comparison, and send the alert to the advertising network.

10. The system of claim 9, wherein the attack includes a distributed denial of service (DDoS) attack.

11. The system of claim 9, wherein the content includes an advertisement.

12. The system of claim 9, wherein the content includes an advertisement from an advertising network.

13. The system of claim 9, wherein the analysis is performed by execution of the file with the browser to determine the second IP address requested by the executed file.

14. The system of claim 9, wherein the processor is a monitoring processor, and the system further comprises:

an advertising network processor, wherein the advertising network processor is configured to be in communication with the monitoring processor;

the monitoring processor is further configured to send the alert to the advertising network processor, wherein the alert includes an identification of the file; and the advertising network processor is further configured to quarantine the file.

15. The system of claim 14, wherein the advertising network processor is further configured to identify a provider of the advertisement.

16. A method to analyze a file, the method comprising, by a processor: receiving the file, wherein the file is received from an advertising network and the processor is associated with the advertising network; wherein the file includes content and instructions, wherein the content includes data executable by a browser to display an advertisement; executing the file; analyzing an amount of resources used by the instructions on the processor during the execution of the file; generating an alert based on the analysis, and sending the alert to the advertising network.

17. The method of claim 16, further comprising quarantining, by the processor, the identified advertisement.

* * * * *